US009942591B2

(12) United States Patent
Stribling

(10) Patent No.: US 9,942,591 B2
(45) Date of Patent: Apr. 10, 2018

(54) SYSTEMS AND METHODS FOR PROVIDING EVENT-RELATED VIDEO SHARING SERVICES

(75) Inventor: Robert Patton Stribling, Monroe, GA (US)

(73) Assignee: Highlight Broadcast Network, LLC, Monroe, GA (US)

( * ) Notice: Subject to any disclaimer, the term of this patent is extended or adjusted under 35 U.S.C. 154(b) by 0 days.

(21) Appl. No.: 13/107,674

(22) Filed: May 13, 2011

(65) Prior Publication Data

US 2011/0279677 A1 Nov. 17, 2011

Related U.S. Application Data

(60) Provisional application No. 61/334,689, filed on May 14, 2010.

(51) Int. Cl.
H04N 3/00 (2006.01)
H04N 21/2743 (2011.01)

(52) U.S. Cl.
CPC ............................. *H04N 21/2743* (2013.01)

(58) Field of Classification Search
CPC ............... H04N 17/00; H04N 21/6118; H04N 21/6582; H04N 7/181; H04N 7/188; A63B 2220/806; A63B 71/0605; G07C 1/24; G06T 7/0081; G06T 7/0083; G06T 2207/10016; G06K 9/38; H04H 60/33; H04H 60/43; G06Q 30/02
USPC ............ 348/157, 135; 715/723, 12; 382/173
See application file for complete search history.

(56) References Cited

U.S. PATENT DOCUMENTS

| | | | |
|---|---|---|---|
| 7,032,177 B2 | 4/2006 | Novak et al. | |
| 8,339,500 B2 * | 12/2012 | Hattori | G11B 27/034 348/207.1 |
| 2003/0122966 A1 | 7/2003 | Markman et al. | |
| 2004/0032495 A1 * | 2/2004 | Ortiz | H04N 5/232 348/157 |
| 2009/0087161 A1 * | 4/2009 | Roberts | G11B 27/031 386/282 |
| 2009/0276805 A1 * | 11/2009 | Andrews, II | G06Q 30/02 725/35 |

(Continued)

OTHER PUBLICATIONS

"eSports: Collaborative and Synchronous Video Annotation System in Grid Computing Environment" Gang Zhai, Geoffrey C. Fox, Marlon Pierce, Wenjun Wu, Hasan Bulut. ISM '05: Proceedings of the Seventh IEEE International Symposium on Multimedia Dec. 2005.*

(Continued)

*Primary Examiner* — Tsion B Owens
(74) *Attorney, Agent, or Firm* — Barry E. Kaplan

(57) ABSTRACT

Systems and methods for providing sports-related video sharing services to subscribers to such services are disclosed. The systems and methods enable the capture and storage of video data corresponding to sporting events held at sports venues, and the communication of captured video data to subscribers or others for viewing. The systems and methods also enable subscribers to create video highlight reels, with or without annotations and/or music, from the captured video data, to post the video highlight reels on web pages hosted by the system, and to communicate the video highlight reels for viewing by others.

20 Claims, 6 Drawing Sheets

(56) References Cited

U.S. PATENT DOCUMENTS

| | | | | |
|---|---|---|---|---|
| 2009/0282337 A1* | 11/2009 | Tilley | ................ | G06F 17/30781 715/719 |
| 2009/0284601 A1* | 11/2009 | Eledath | .................. | G06K 9/209 348/157 |
| 2010/0031149 A1* | 2/2010 | Gentile | ..................... | G06T 5/50 715/723 |
| 2010/0324919 A1* | 12/2010 | Shore | ................... | G11B 27/034 705/1.1 |
| 2011/0202967 A1* | 8/2011 | Hecht | .................. | G11B 27/034 725/114 |
| 2011/0212756 A1* | 9/2011 | Packard | ............... | H04N 21/251 463/1 |
| 2011/0231887 A1* | 9/2011 | West | ..................... | G11B 27/34 725/116 |

OTHER PUBLICATIONS

International Patent Application No. PCT/US2011/036522: International Search Report dated Oct. 19, 2011, 2 pages.

\* cited by examiner

SYSTEMS AND METHODS FOR PROVIDING EVENT-RELATED VIDEO SHARING SERVICES

CROSS-REFERENCE TO RELATED APPLICATION

This application claims priority under 35 U.S.C § 119(e) to U.S. provisional application Ser. No. 61/334,689, filed on May 14, 2010, entitled "Systems and Methods for Providing Event-Related Video Sharing Services," which is incorporated herein by reference in its entirety.

TECHNICAL FIELD

The present invention relates, generally, to the field of video sharing services, including systems and methods for the capture, editing, and sharing of video data related to sports events.

BACKGROUND

The popularity of sports and sporting events has grown tremendously in recent years. While much of the interest in sports has been at the college and professional levels where many of the sporting events are televised around the world, there has also been substantial growth in the popularity of sports in which the participants are of high school or pre-high school age.

Unfortunately, most of the sporting events involving junior college, school or pre-high school age are not televised and can only be viewed by those individuals who are able to attend them in person. Thus, for example, when a father is out of town on a business trip and cannot be present at his daughters high school volleyball game, he must watch the game on video when he returns home from his trip in order to view his daughter playing in the game. Similarly, a college football scout cannot attend all of the numerous junior college and high school football games played around the country on a particular night involving players who might be candidates for a football scholarship to the college with which the scout is affiliated. To observe and evaluate such players, the college must obtain videos of the games and then the scout must watch numerous hours of video in order to identify and view particular plays involving players of interest.

Therefore, there is a need in the industry for systems and methods for providing sports-related video sharing services, and that may address other problems, difficulties, and/or shortcomings of current technology that may or may not be described herein.

SUMMARY

Broadly described are systems and methods for providing event-related, such as sporting events, video sharing services to subscribers to such services. The systems and methods enable the capture and storage of video data corresponding to sporting events held at sports venues, and the communication of captured video data to subscribers or others for viewing at any time. The systems and methods also enable subscribers to create video highlight reels, with or without annotations and/or music, from the captured video data, to post the video highlight reels on web pages hosted by the system, and to communicate the video highlight reels for viewing by others.

DETAILED DESCRIPTION OF ILLUSTRATIVE EMBODIMENTS

Figure 1:
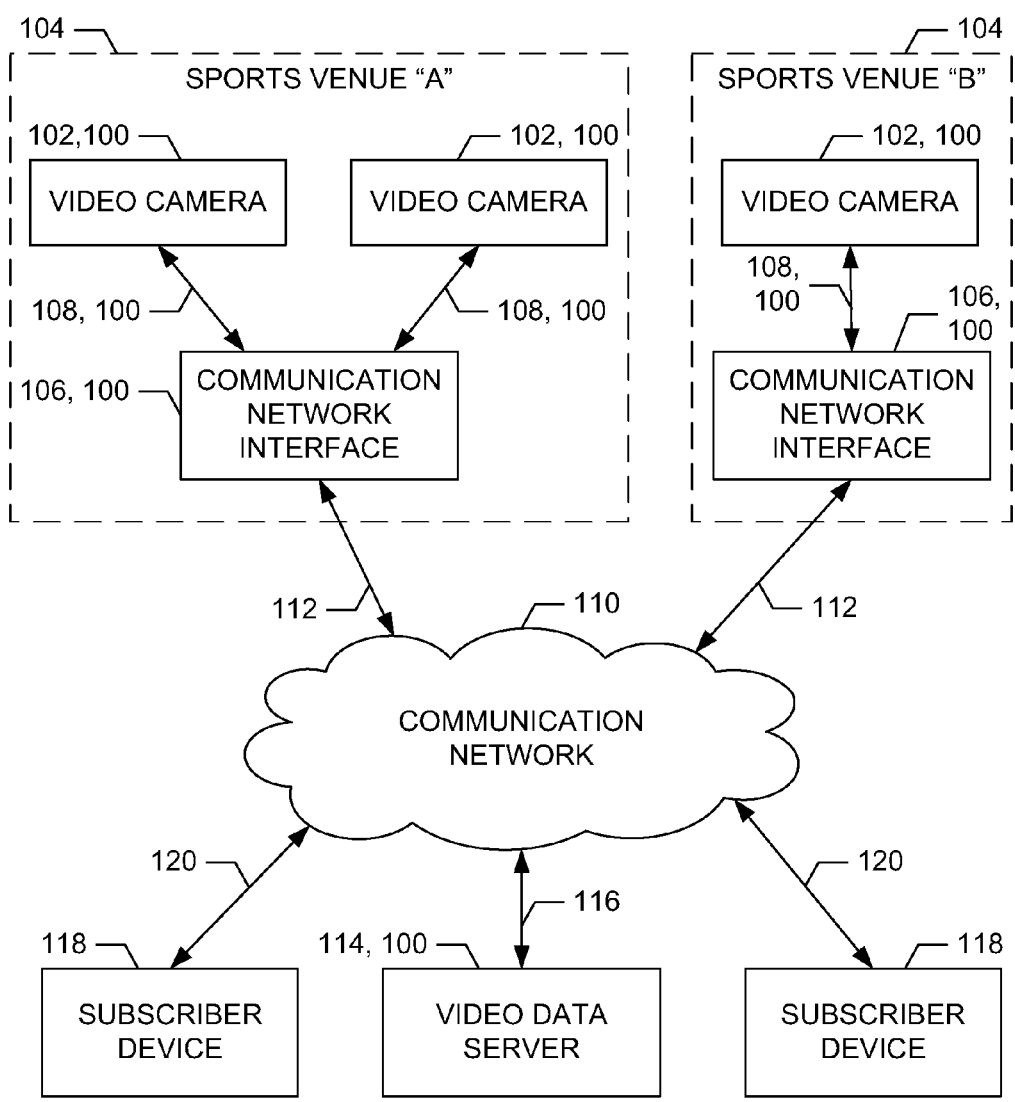
FIG. 1 displays a block diagram representation of a sports-related video sharing system in accordance with the present invention.

Referring now to the drawings in which like numerals represent like elements or steps throughout the several views, FIG. 1 displays a block diagram representation of a sports-related video sharing system 100 and environment therefore. However, the present invention is not limited to sporting events. Rather, the present invention is directed to any event. An event is defined to include any activity or occurrence of social or personal importance. The sports-related video sharing system 100 (also sometimes referred to herein as the "system 100") provides video sharing services for sporting events to subscribers who may pay a subscription fee to the system's owner/operator for use of the video sharing services. The sporting events include, but are not limited to, football, basketball, baseball, soccer, hockey, gymnastics, wrestling, swimming, diving, cycling, golf, skiing, cricket, and track/field games or matches at levels of competition such as high school, college, amateur, semi-professional, and professional. The subscribers for the video sharing services include a wide variety of individuals and business entities, including for example and not limitation, athletes, parents of athletes, booster club participants, coaches, scouts, fans, high schools, colleges, professional sports teams, and television stations and other news outlets. The subscription fee can comprise, but is not limited to, an annual subscription fee, a monthly subscription fee, a season subscription fee, a single use subscription fee, or a combination thereof.

In operation, system 100 captures and stores video data corresponding to sporting events at one or more sports venues whose owners/operators have agreed to permit video cameras to be installed at the venues in exchange for some consideration, such as, for example, a portion of the subscription fees paid by subscribers. Subsequently, system 100 provides subscribers with access to the stored video data via a communication network such as, but not limited to, the Internet and enables subscribers to view the video data for selected sporting events of interest to the subscribers. System 100 also enables subscribers to create video highlight reels, including video data for selected plays from the sporting events, and to annotate the video data of the highlight reels with comments or other information. Additionally, system 100 enables subscribers to send the video highlight reels or links thereto, via the communication network, to others who may be interested, in viewing the video highlight reels. For example, using this latter feature, athletes can create video highlight reels comprising a compilation of plays from many sporting events in which they have participated for submission to college and/or professional coaches and/or scouts to aid the coaches and/or scouts with their recruiting efforts. In another example, athletes can create a similar video highlight reel for a particular sporting event so that a parent can view the video highlight reel at a later time. In addition, system 100 can display advertisements via the systems user interfaces from advertisers who have paid an advertising fee to the system's owner/operator for such advertising.

System 100, as displayed in FIG. 1, which is and in accordance with an aspect of the present invention, comprises one or more video cameras 102 located at each sports venue 104. Each video camera 102 is configured to capture video data corresponding to a sporting event ongoing at sporting venue 104 at which video camera 102 is located. Optionally, some video cameras 102 can be remotely controlled and/or be responsive to motion so that plays of a sporting event can be tracked by video camera 102. Other video cameras 102, optionally, can also have the ability to zoom in or out so as to provide close ups of athletes or of portions of plays.

Each video camera 102 is also configured to output the video data corresponding to a sporting event to communication network interface 106 of system 100 via bidirectional communication link 108. Generally, communication network interface 106 is located at each sports venue 104 and is connected to communication network 110 by a bidirectional communication link 112. Each communication network interface 106 is adapted to receive captured video data from one or more video cameras 102 located at sports venue 104 and to communicate the captured video data to communication network 110. Each communication network interface 106 can also he adapted to receive commands from one or more video data server 114, described below, via communication network 110 and bi-directional communication link 112, and to act in response to the received commands or to communicate the received commands, as need be, to appropriate video cameras 102 over one or more appropriate bi-directional communication links 108. Such commands can include directions to start/stop capturing video data, to move video camera 102 to point in a different direction, to zoom in/out video camera 102, and to communicate and/or stream captured video data.

Communication network 110 is adapted to bi-directionally communicate captured video data, commands, replies to commands, messages, and other data and/or information. In accordance with an aspect of the present invention, communication network 110 comprises communication facilities and infrastructure commonly referred to as the Internet. However, in other embodiments, communication network 110 can comprise other communication facilities and infrastructure having similar capabilities.

System 100 further comprises one or more video data servers 114 that are communicatively connected to communication network 110 by bi-directional communication links 116 and, hence, to video cameras 102 additionally by appropriate communication network interfaces 106 and bi-directional communication links 108, 112. Video data servers 114 are also communicatively connected to subscriber devices 118 via communication network 110 and bi-directional communication links 116, 120. Video data servers 114 are configured to control operation of video cameras 102 located at sports venues 104, to receive captured video data corresponding to sporting events from video cameras 102, and/or to communicate the captured video data to subscriber devices 118 for viewing. Video data servers 114 are also configured with computer software appropriate for the creation of video highlight reels from the captured video data in response to inputs made by and received from subscribers via subscribers' devices 118. The computer software is also appropriate for adding textual or graphic annotations, voice commentary, and/or music to the video highlight reels as desired by subscribers. Additionally, video data servers 114 are configured to host subscribers' web pages and to post video highlight reels on subscribers' web pages for selection. In addition, video data servers 114 are configured to communicate video data corresponding to video highlight reels to subscriber devices 118 for viewing and/or to other devices and/or video sharing service providers such as, for example and not limitation, the popular video sharing service provider known as "YOUTUBE".

Generally, subscriber devices 118 include personal computers and other similar devices, such as smart phones, tablet computers, and the like, that are equipped with browser computer software that enables subscriber devices 118 to establish a communication session with video data server 114 for the viewing of captured video data, editing of captured video data to create video highlight reels, viewing of highlight reels, and causing the communication of video highlight reels or links thereto to other devices. It should be appreciated, however, that subscriber devices 118 can include other devices that are equipped with browser computer software having lesser capabilities or that are not equipped with browser computer software at all. In some of such cases, subscriber devices 118 can be limited to only receiving and viewing video highlight reels that are received by subscriber devices 118 as, for example, attachments to electronic mail.

Figure 2A:
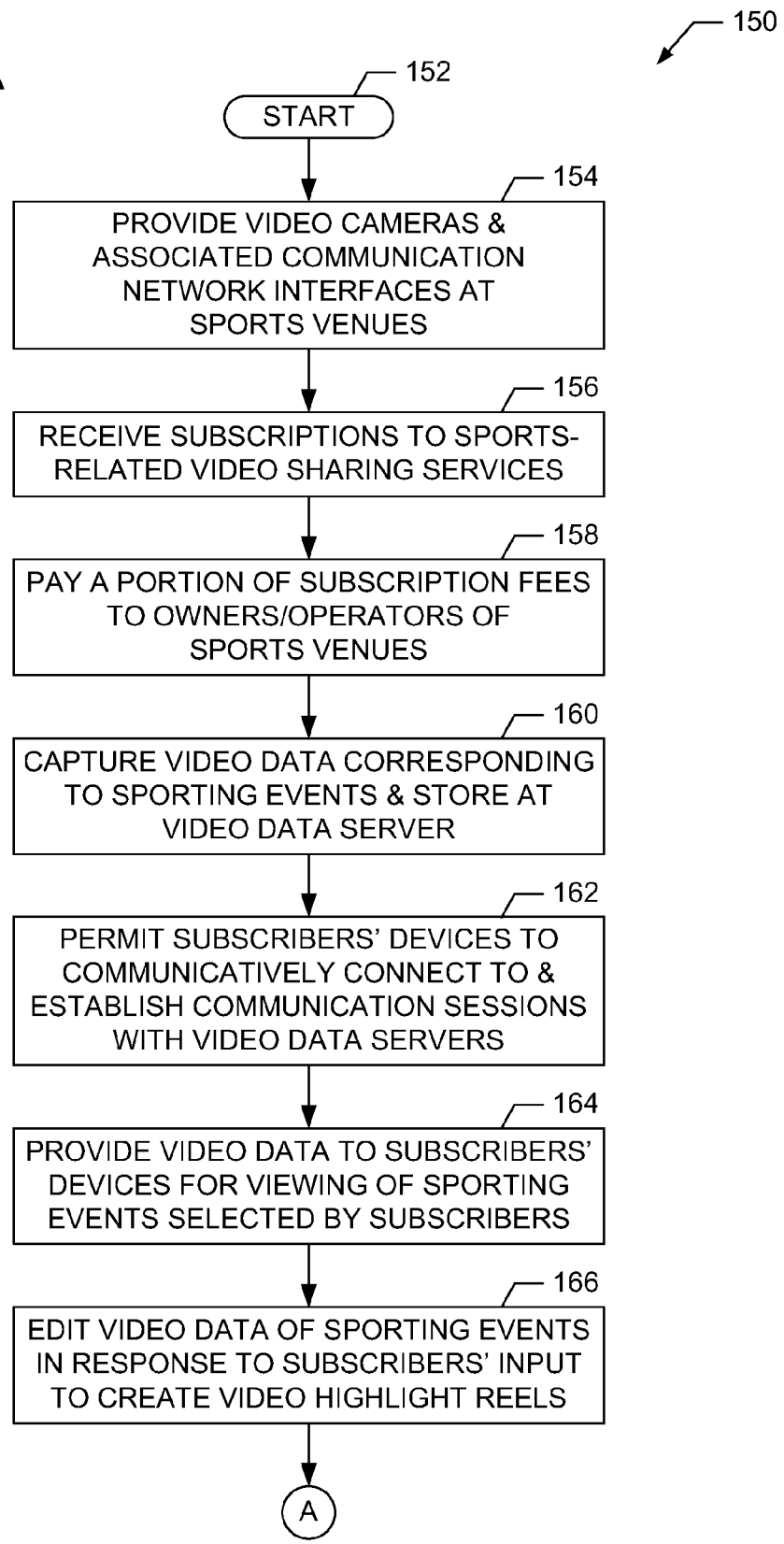
FIGS. 2A-2B display a flowchart representation of a method of establishing and operating the sports-related video sharing system in accordance with the present invention.
Figure 2B:
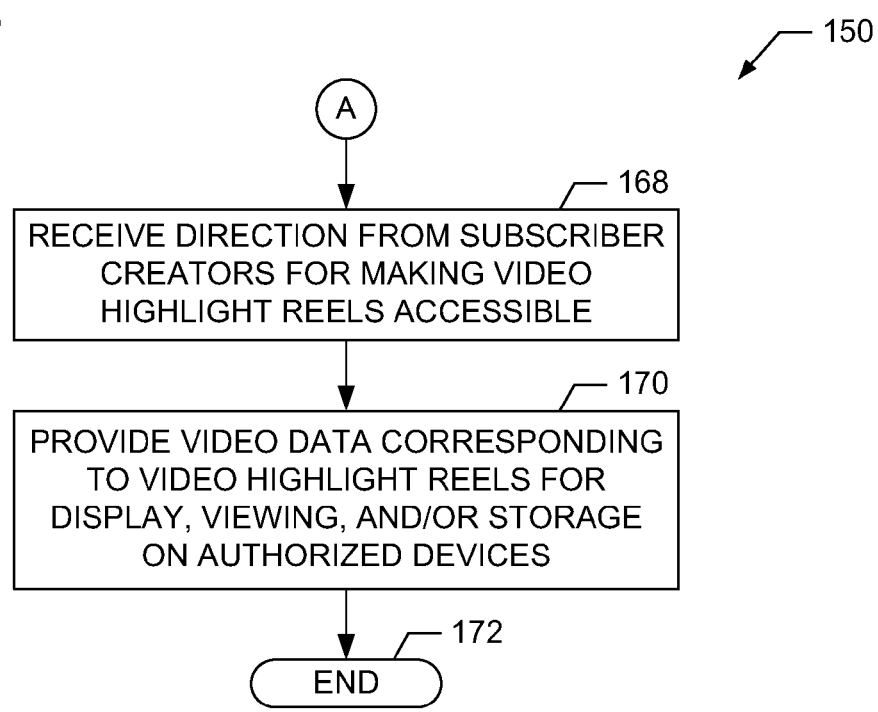

FIG. 2 displays a flowchart representation of method 150 of establishing and operating a sports-related video sharing system 100 in accordance with the present invention. After method 150 starts at step 152, system 100 provides video cameras 102 and associated communication network interfaces 106 at step 154 that are installed at sports venues Continuing at step 160, system 100 uses video cameras 102 to capture video data corresponding to the sporting events held at the sports venues and stores the captured video data at one or more video data servers 114. Then, at step 162, system 100 permits subscribers' devices 118 to communicatively connect to video data server 111 and establish a communication session with video data server 114. Advancing to step 164 and in response to received subscriber input identifying sporting events desired for viewing, system 100 provides or communicates captured video data corresponding to sporting events to subscribers' devices 118 for display and viewing thereon. Subsequently, at step 166, system 100 edits captured video data corresponding to sporting events in response to subscriber input to create video highlight reels.

At step 168, system 100 receives direction from subscriber creators of video highlight reels for making the video highlight reels accessible to other subscribers and/or other parties. For example and not limitation, such direction can include posting a video highlight reel on a subscriber's web page for selection and viewing by other subscribers. In further example, such direction can include information identifying other subscribers who can view the video highlight reels. In still further example, such direction can include information instructing system 100 to attach a video highlight reel, or link thereto, to an electronic mail and to send the electronic mail with attached video highlight reel or link to a party identified by an input electronic mail address. Proceeding to step 170, system 100 provides video data corresponding to video highlight reels to authorized subscribers' devices or other devices, as directed, for display, viewing, and/or storage. After providing the video data corresponding to video highlight reels, system 100 ends operation according to method 150 at step 172 thereof.

It will be recognized that, in some embodiments of system 100, a user may be permitted to upload to system 100 authorized video content such as may be recorded by personal or third party cameras, wherein said video subsequently may be stored, edited, processed, and distributed by system 100 in accordance with steps 162 and following.

Figure 3:
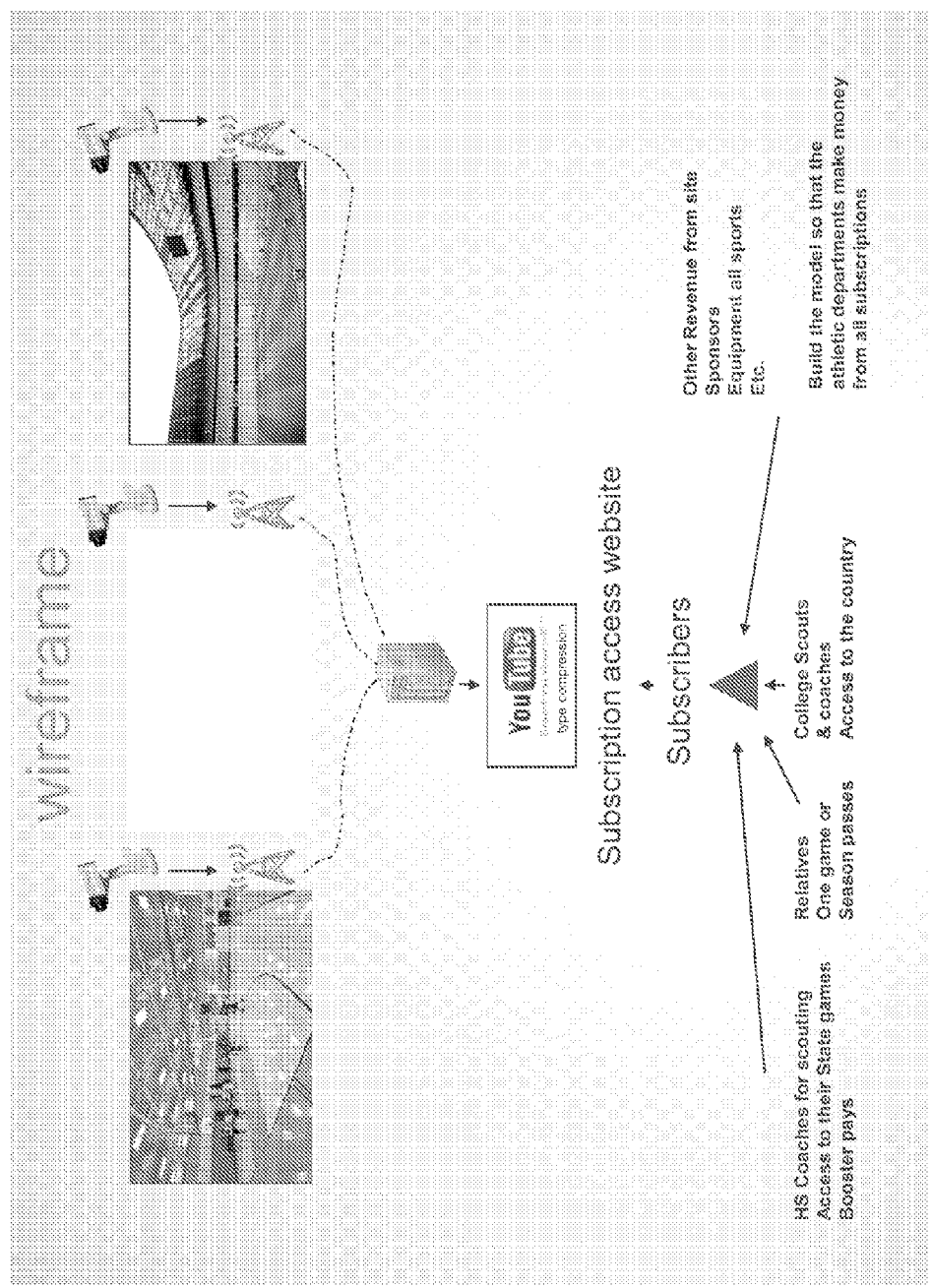
FIG. 3 displays a pictorial representation of the sports-related video sharing system in accordance with the present invention.
Figure 4:
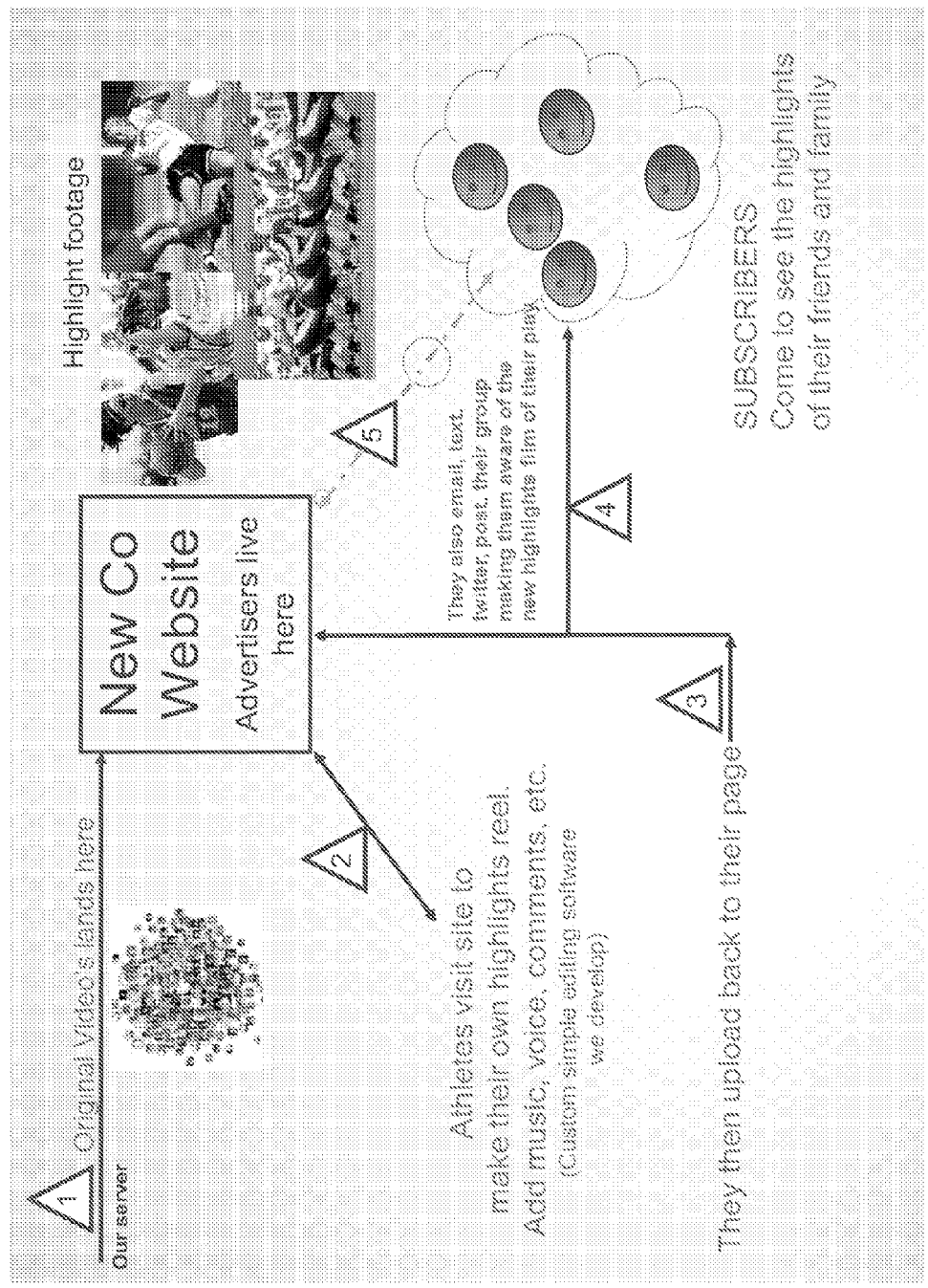
FIG. 4 displays a pictorial representation of portions of the method of establishing and operating the sports-related video sharing system in accordance with the present invention.
Figure 5:
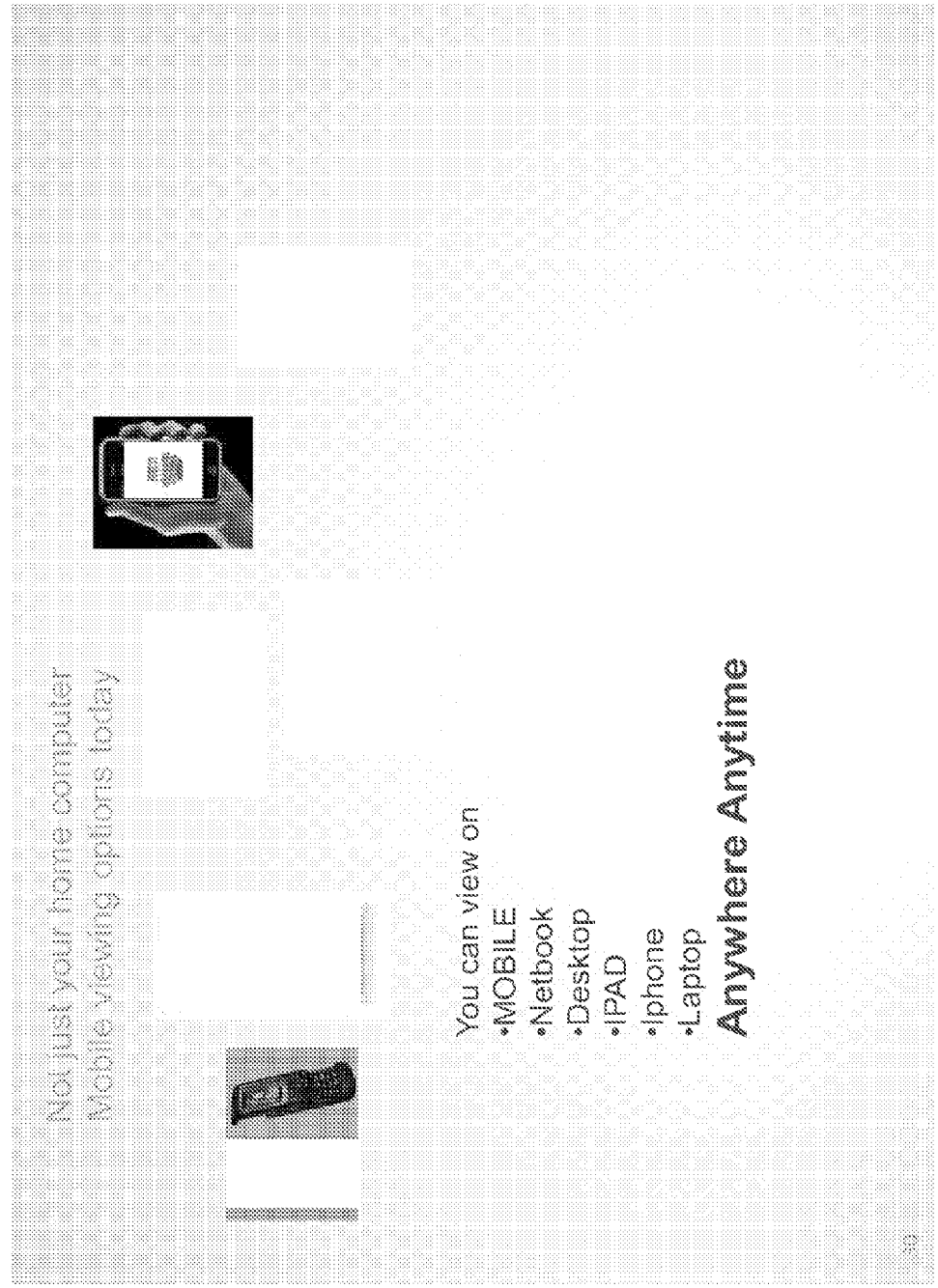
FIG. 5 displays a pictorial representation of some devices on which a subscriber may view captured video data and/or video highlight reels provided by the sports-related video sharing system in accordance with the present invention.

FIGS. 3, 4 and 5 display and provide additional descriptive information pertaining to the systems and methods for providing sports-related video sharing services in the form of pictorial representations.

It will be recognized that system 100 may provide ancillary and/or additional functionality, such as the ability to store and deliver player-based instructional content; inter-user communication functionality, such as chat or blog areas; Really Simple Syndication ("RSS") feeds; fan portals; a user "locker room" comprising user-specific data, advertising, and content; a system for aggregating user-points earned with sponsors; and the like.

It will also be recognized that any of the variety of storage devices, video servers, video processing components, network components, servers, computers, and the like, as are described herein, may be configured and located according to any of a variety of operational and/or infrastructure configurations well-known in the art. For example, computer hardware, network components, storage devices, editing and processing software and devices, and the like, may be physically located at a provider or host location, at a sport venue, in a virtualized (e.g., "cloud-based" or remote network) environment, and the like; they may be configured to share or extend one or more functions described herein according to system, network, or software-defined criteria; and they may be scaled to accommodate system, network, data, or user load variations, to provide additional data storage and processing capabilities, to provide extended network functionality, and the like.

Whereas the present invention is described in detail with respect to the example, and numerous aspects thereof described herein, it should be understood that variations and modifications may be effected within the spirit and scope of the present invention, as described herein before and as defined in the appended claims.

What is claimed:

1. A system for providing sports-related video sharing services to subscribers of such services, the system comprising:

a video camera configured to capture videographic data corresponding to a live sporting event held at a sport venue, said video camera configured to communicate said videographic data to a communication network, said communication network configured to receive commands and act in response thereto to direct said video camera to begin or cease capturing videographic data, to move in a different direction, to zoom in or out, or to communicate or stream said captured videographic data;

a memory configured to store said videographic data corresponding to a live sporting event held at a sport venue;

a processor configured to manipulate said videographic data, in association with a videographic editor configured to create a highlight reel and to extract said highlight reel from said videographic data, all in response to an input in the form of one or more commands provided by a remote subscriber using a remote subscriber computing device to communicate said one or more commands to said system, said manipulation, creation, and extraction enabled to occur nearly concurrently in response to said input, in order to create and extract said highlight reel from said videographic data and to store said extracted highlight reel within said memory, all on a per-remote-subscriber basis;

said highlight reel comprising a subset of videographic data corresponding to a video clip of at least one per-remote-subscriber-selected play occurring during the sporting event, said per-remote-subscriber-selected play being chosen by each remote subscriber and extracted from the entirety of videographic data captured during said sporting event;

a network accessible server configured to host per-remote-subscriber-specific content comprising each remote subscriber's said highlight reel retrieved from said memory, and to allow remote access to said per-remote-subscriber-specific content by said remote subscriber;

sharing means for allowing each remote subscriber to communicate said highlight reel or, alternatively, to communicate an electronically addressable location for accessing said highlight reel via the network, to one or more third-parties for viewing.

2. The system of claim 1 further comprising a videographic camera located at said sport venue.

3. The system of claim 2, wherein said camera captures said videographic data for storage by said memory.

4. The system of claim 2, wherein said camera may be controlled by a remote operator.

5. The system of claim 1, wherein said videographic data is stored to said memory by a subscriber of said system at a location remote from said memory.

6. The system of claim 1, wherein manipulation of said videographic data further comprises the addition to said highlight reel of one or more subscriber-directed features, said features selected from the group consisting of textual annotations, graphic annotations, voice commentary, and music.

7. The system of claim 1, wherein said network accessible server is a web server.

8. The system of claim 1, wherein said subscriber-specific content is hosted upon a subscriber-specific web page.

9. The system of claim 1, wherein said sharing means for allowing said subscriber to communicate said highlight reel or, alternatively, to communicate an electronically addressable location for accessing said highlight reel via the network, to one or more third-parties for viewing comprises a web-link.

10. The system of claim 1, wherein said input in the form of one or more commands provided by a remote subscriber of said system is accepted by said processor via a network communications interface configured to link to a subscriber device.

11. A computer implemented method for providing sports-related video sharing services to subscribers of such services, the method comprising:

capturing videographic data corresponding to a live sporting event held at a sport venue;

communicating said videographic data to a communication network, said communication network configured to receive commands and act in response thereto to direct said video camera to begin or cease capturing videographic data, to move in a different direction, to zoom in or out, or to communicate or stream said captured videographic data;

receiving videographic data corresponding to the live sporting event held at a sport venue and storing said videographic data in a memory;

manipulating said videographic data, via computer processor means in association with a videographic editor configured to create a highlight reel and to extract said highlight reel from said videographic data, all in response to input in the form of one or more commands communicated by a remote subscriber to said system via a remote subscriber computing device, said manipulation, creation, and extraction enabled to occur nearly concurrently in response to said input;

creating an excerpted video clip from said videographic data and storing said excerpted video clip within said memory on a per-remote-subscriber basis;

said excerpted video clip comprising a subset of videographic data corresponding to at least one per-remote-subscriber-selected play occurring during the live sporting event, said per-remote-subscriber-selected play being chosen by each remote subscriber and extracted from the entirety of videographic data captured during said live sporting event;

hosting, in association with a network accessible server, per-remote-subscriber-specific content comprising said excerpted video clip retrieved from said memory;

providing remote access to said per-remote-subscriber-specific content on a per-remote-subscriber basis;

providing each said remote subscriber with sharing means to communicate said excerpted video clip or, alternatively, to communicate an electronically addressable location for accessing said excerpted video clip via the network, to one or more third-parties for viewing.

12. The method of claim 11, wherein said videographic data is received from a videographic camera located at a remote venue.

13. The method of claim 11, wherein said videographic data is received from a remote subscriber device.

14. The system of claim 11, wherein manipulation of said videographic data further comprises the step of adding to said clip one or more subscriber-directed features, said features selected from the group consisting of textual annotations, graphic annotations, voice commentary, and music.

15. The method of claim 11, wherein said network accessible server for hosting subscriber-specific content comprises a web server.

16. The method of claim 11 further comprising hosting said subscriber-specific content upon a subscriber-specific web page.

17. The method of claim 11, wherein said subscriber means to communicate said clip or, alternatively, an electronic location for accessing said clip, to one or more third-parties for viewing comprises a web-link for distribution via electronic mail.

18. A computer-implemented system for providing sports-related video sharing services to subscribers of such services, the system comprising:

a video camera located at a sport venue, said video camera configured to capture videographic data corresponding to a live sporting event held at a sport venue, said video camera configured to communicate said videographic data to a communication network, said communication network configured to receive commands and act in response thereto to direct said video camera to begin or cease capturing videographic data, to move in a different direction, to zoom in or out, or to communicate or stream said captured videographic data;

a memory configured to receive and store said videographic data from said camera, said data corresponding to a live sporting event held at said sport venue;

a video data server comprising a processor configured to manipulate said videographic data, in association with video editing software configured to create a highlight reel and to extract said highlight reel from said videographic data, all controlled, at least in part, by an input in the form of one or more commands provided by a remote subscriber using a remote subscriber computing device to communicate said one or more commands to said system, said manipulation, creation, and extraction enabled to occur nearly concurrently in response to said input, in order to create and extract said highlight reel from said videographic data and to store said extracted highlight reel within said memory, all on a per-remote-subscriber basis;

said highlight reel comprising a subset of videographic data corresponding to a video clip of at least one per-remote-subscriber-selected play occurring during the sporting event, said per-remote-subscriber-selected play being chosen by each remote subscriber and extracted from the entirety of videographic data captured during said sporting event;

a web accessible server configured to host per-remote-subscriber-specific content comprising each remote subscriber's said highlight reel retrieved from said memory, and to allow remote access to said per-remote-subscriber-specific content by said remote subscriber;

web enabled sharing means for allowing each remote subscriber to distribute said highlight reel or, alternatively, to communicate an electronically addressable location for accessing said highlight reel via the network, to one or more third-parties for viewing.

19. The system of claim 18, wherein manipulation of said videographic data further comprises the addition to said highlight reel of one or more subscriber-directed features, said features selected from the group consisting of textual annotations, graphic annotations, voice commentary, and music.

20. The system of claim 18, wherein said input in the form of one or more commands provided by a remote subscriber of said system is accepted by said processor via a network communications interface configured to link to a remote subscriber device.

* * * * *